Patented Oct. 3, 1944

2,359,413

UNITED STATES PATENT OFFICE 2,359,413

VITAMIN AND MINERAL COMPOSITION

Louis Freedman, Mount Vernon, N. Y., assignor to U. S. Vitamin Corporation, a corporation of Delaware No Drawing. Application August 7, 1941, Serial No. 405,831

2 Claims. (Cl. 167—81)

This invention relates to a vitamin and mineral composition and particularly to an intimate mixture, including vitamins, supplementing minerals, and water, that retains its vitamin activity for a long period of time.

It has become general practice to fortify various types of foodstuffs, which normally are either low in or devoid of vitamin content, with vitamins of synthetic or natural origin, in order to increase the vitamin content of the particular foodstuffs. The desirability of fortifying with vitamins is well known. Likewise, mineral elements in the form of both organic and inorganic salts are sometimes added to foodstuffs for the purpose of increasing the mineral content.

The fortification of such foodstuffs is generally carried to the extent that the final prepared products contain the vitamins and minerals only to the extent originally contained in the foods naturally, although in certain cases the fortification may be somewhat greater to allow for losses sustained for various reasons. In general, these fortified foodstuffs contain the added vitamins and minerals only in such amounts that, when the product itself is used as a food, the consuming animal will receive its appropriate supply of vitamins and minerals.

In supplementing the nutrition of animals, particularly domestic animals, in which can be included dogs and horses, it is desirable to include all of the known vitamins required by these animals and some of the at present unidentified vitamins together with a plurality of essential minerals. The general practice among veterinarians and physicians is to administer the vitamins in one medium, as for instance in a gelatin capsule, and the minerals in a separate capsule or tablet, the purpose being to keep the vitamins and minerals separated until taken internally.

The reason for this separated and inconvenient administration is the instability of certain vitamins when incorporated with minerals, the term minerals including inorganic compounds, particularly salts, that are desirable in diets in association with vitamins. For instance, it is stated or understood that vitamin A is incompatible or unstable with certain iron salts in a reduced state, such as ferrous sulfate, vitamin $B_1$ with ferric salts, vitamin C with certain salts of copper, and vitamin D with some calcium salts.

While the reason for the incompatibilities between certain vitamins and mineral salts are not fully understood with certainty in the present state of knowledge of the art, it is common practice in the dispensing field, when compounding minerals and vitamins in the liquid or semi-liquid state, to keep the vitamins separated from the minerals. In this manner there is avoided loss of vitamin activity.

It is very desirable from the standpoint of efficiency, economy and convenience, however, to be able to administer to man or animals vitamins and mineral supplements in which these classes of materials are incorporated together in relatively concentrated form, so that only a single small dose, such as a teaspoonful or a tablespoonful, provides all that is required of both materials. This form of administration is of particular advantage to dietitians and clinicians, since it does not disrupt the diets or dietary habits of the individuals. It is likewise of extreme importance to animal breeders and trainers and veterinarians. There is no appreciable interference with the normal dietary of the animals and there is thus avoided the administration of great quantities of bulky food materials otherwise necessary to supply the requirements of vitamins.

I have now discovered a composition that makes possible the premixing and administration in one medium of all of the essential vitamins and minerals that are deficient in the usual human or animal diet, the composition being stable in its vitamin activity, that is, showing at the most a loss of vitamin activity at the rate of only 5 to 20 per cent or so in a five months' period of storage.

Briefly stated, the invention comprises a mixture of water-soluble and water-insoluble vitamins, a mineral supplement including heavy metal compounds that are insoluble in water but soluble in gastric juice and water-soluble alkali metal compounds, and an aqueous solution as the base medium, the water-soluble vitamins and alkali metal compounds being dissolved, the water-insoluble vitamins being emulsified or dispersed, and the heavy metal compounds being suspended in finely divided form in the said solution and the composition including an acidic material establishing the pH of the composition below 7 but above the pH at which the heavy metal compounds dissolve in the particular acid present. For best results, the pH is established within the range of approximately 3 to 6 by means of an alkali metal acid phosphate and the said aqueous solution comprises a water-soluble organic compound that by its presence decreases the concentration of metal ions present.

As the vitamin component I use a mixture of water-soluble and water-insoluble vitamins including those that are conventionally used as a supplement to diets. Thus, I use a plurality of vitamins including vitamin A, vitamin $B_1$ known chemically as thiamine hydrochloride, vitamin $B_2$ known chemically as riboflavin, vitamin C known chemically as ascorbic acid, vitamin D known chemically as calciferol (irradiated ergosterol), and vitamin E known chemically as alpha-tocopherol.

The vitamins used may be either the synthetic materials or concentrates derived and purified from natural sources.

Any of the known natural substances containing the commonly known vitamins may be used satisfactorily. I have found, for example, that fish livers or fish liver oils containing vitamins A and D in relatively high potencies can be used as well as the unsaponifiable concentrates derived from fish livers or fish liver oils. For the vitamins of the B group, such as vitamin $B_1$, $B_2$ (G), and the known and unknown vitamins of the B complex, I have used satisfactorily extracts derived from brewers' yeast, dried rice polish and rice bran, and extracts derived from the rice polish and bran. Substances that contain provitamin D and are irradiated, such as irradiated dry yeast, have proven good sources of vitamin D for my purposes. Wheat germ oil is utilizable as a source of vitamin E, although other oils containing vitamin E or concentrates of such oils may be used.

As the mineral supplement there are used the inorganic compounds that are commonly used to overcome dietary deficiencies. Thus, there may be used salts of the alkaline earth metals, iron, copper, manganese, zinc or the like, such metals being herein referred to for convenience as the "heavy metals." In addition, there are used salts of the alkali metals in those compositions in which there would be an objectionable deficiency of such alkali metals if none were incorporated.

The heavy metals are used in water-insoluble form as, for example, in the form of their phosphates, acid phosphates, carbonates, or oxides, the particular compound of any metal being selected in accordance with the known solubility of its compounds so as to obtain a compound that is insoluble in water but soluble in gastric juice, the solubility in the latter being tested conveniently by determining whether or not the heavy metal compound dissolves in a hydrochloric acid solution of concentration 0.2%. Also, the heavy metal compound selected is one that is non-toxic in the proportion used.

It is sometimes desirable, in the interest of economy or for other reasons, to select a metal compound that contains not only the desired metal but also another element that is deficient in the diet. Thus, it is good practice to use a phosphate of at least one of the metals, so as to provide phosphorus for the diet. Also, iodides may be used to provide iodine.

Among such heavy metal compounds that may be used are the following: tricalcium phosphate, dicalcium phosphate, and calcium carbonate; ferric oxide, ferric phosphate, and pyrophosphate; basic copper carbonate and copper phosphate; magnesium oxide, biphosphate, and pyrophosphate; zinc oxide and carbonate; and manganese oxide and hydroxide and manganic phosphate.

Alkal metal salts are used in the form of water-soluble salts as, for example, the chloride, a phosphate, iodide or sulfate. Sodium and potassium are the alkali metals ordinarily used. The chloride, iodide, and sulfate are known to be practically neutral.

As the base material into which the vitamins and minerals are incorporated there is used an aqueous solution. To decrease the tendency to segregation of undissolved solid material in the composition, the specific gravity of the aqueous solution is made to approach that of the mixture of solid materials present. Thus, the aqueous solution has to advantage a specific gravity of about 1.25 to 1.45 and preferably 1.3 to 1.4.

In order to establish this specific gravity of the aqueous medium and also to decrease its dissociation effect, that is, the concentration of heavy metal ion present in the said aqueous solution, there is incorporated into the water a soluble organic material, such as molasses, malt, sucrose, dextrose, corn syrup, invert sugar, or other sugar, glycerine, or the like. The medium should be syrupy and give to the whole composition a syrupy (moderately viscous) nature that prevents segregation. These media are known to be edible in the amounts used.

My composition includes also an acidic material establishing the pH at a value below 7 but above that at which the heavy metal compounds dissolve in the aqueous solution constituting the base medium and in the presence of the particular acidic material and other ingredients present. Particularly satisfactory results as to vitamin stability of the composition have been obtained when the acidic material is used in such amount as to establish the pH within the range 3 to 6.

The acidic material may be an added ingredient such as a small proportion of citric, tartaric, or phosphoric acid. Or, the acidic ingredient may be one of the metal compounds previously referred to. Thus, the acidity is provided to advantage by the use of acid salts of the metals, as for example an acid salt of sodium or potassium with citric, tartaric or phosphoric acid.

The amount of the acidic material required to establish the pH within the range stated is readily determined by simple experiment, the amount to be added varying somewhat with the kind and proportion of the other metal compounds present.

The vitamins and minerals present may be used in various proportions without the loss of stability of the composition, so long as the pH is kept below 7 and the heavy metal compounds are in largely undissolved condition. In such case there is no danger of objectionably high rates of loss of vitamin activity due to the presence of any vitamin or any conventional mineral supplement, in any proportion called for by the diet. Any proportions of the vitamins and mineral supplements may be used to meet the deficiency of any diet.

The invention will be further illustrated by description in connection with the following examples:

EXAMPLE I 561 grams of tricalcium phosphate, 150 grams of sodium chloride, 140.5 grams of potassium biphosphate, 13.8 grams of magnesium oxide, 8.0 grams of ferric oxide (brown powder, 3.3 grams of manganese sulphate tetrahydrate, 1.05 grams of basic copper carbonate, and 0.732 grams of zinc oxide are thoroughly mixed in dry powdered form. This mineral mix is incorporated with 1676 grams of invert sugar syrup (containing approximately 67.7% of solids) in a pony mixer, ball mill, colloidal mill, or any other suitable form of mixer, until a smooth pasty mass is obtained.

To this mixture there is then added and thoroughly incorporated, the following mixture of substances: 50 grams of dried brewers' yeast, 26.8 grams of irradiated dry yeast (containing 7200 international units of vitamin D per gram), 0.183 gram of thiamine hydrochloride, 0.095 gram of riboflavin crystals, 0.0135 gram of pyridoxin hydrochloride, and 0.98 gram nicotinic acid.

To the resulting mixture, designated as mix A, is then added the following mixture of substances designated as mix B. 115.5 grams of a rice bran extract having a specific gravity of 1.37 and containing at least 50 international units of vitamin $B_1$ and other vitamin B complex factors, 107.3 grams of wheat germ oil, 1.53 grams of vitamin A concentrate containing 1,530,000 international units of vitamin A, 2,338 grams of blackstrap molasses, and 0.08 gram of potassium iodide dissolved in 1 cc. of water. Mix A and mix B are thoroughly mixed in any suitable type of mechanical mixer.

The described steps of mixing should be carried out preferably at average room temperature; in any case the temperature should not be allowed to rise substantially above 50° C. It is also advantageous to carry out the mixing steps in a non-oxidizing atmosphere.

The combining of mix B with mix A results in an intimate physical combination of the various ingredients, in a syrupy liquid form having a specific gravity of about 1.375 and a pH of 5.5 and comprising a volume of approximately 1 fluid gallon. The water-soluble vitamins and salts are dissolved in the aqueous base medium of water, invert sugar, and molasses. The various solid or undissolved ingredients are in a state of very fine suspension or colloidal dispersion, as shown by the absence of settling, even after several months standing.

The product obtained in this example has a calcium to phosphorus ratio of approximately 1.2 to 0.8 and as such is particularly suitable as a supplement for horses and other large herbivorous animals.

EXAMPLE II 414 grams of tricalcium phosphate, 200 grams of sodium chloride, 272 grams of potassium biphosphate, 69 grams of magnesium biphosphate, 0.702 gram of basic copper carbonate, 4.5 grams of ferric oxide (brown powder), 0.79 gram of manganese pyrophosphate, and 0.485 gram of zinc oxide are thoroughly mixed in dry powdered form. This mineral mix is incorporated into 1700 grams of invert sugar syrup (containing approximately 67% of solids) in the same manner described in Example I.

To this mixture there is then added and thoroughly incorporated the following mixture of substances: 50 grams of dried brewers' yeast, 26.4 grams of irradiated dry yeast (containing 7200 international units of vitamin D per gram), 0.11 gram of thiamine hydrochloride, 0.184 gram of crystalline riboflavin, 0.0083 gram of pyridoxine hydrochloride, and 2.75 grams of nicotinic acid.

To the resulting mixture, designated as mix A, there is then added the following mixture of substances, designated as mix B: 113.5 grams of rice bran extract (having a specific gravity of 1.37 and containing at least 50 international units of vitamin $B_1$ and other vitamin B complex factors), 167 grams of wheat germ oil, 1.72 grams of a vitamin A concentrate (containing 1,720,000 international units of vitamin A), 2172 grams of blackstrap molasses and 0.009 gram of potassium iodide dissolved in 1 cc. water.

Mix A and mix B are thoroughly mixed as described in Example I, resulting in the same type of semi-colloidal aqueous syrupy mixture, having a volume of 1 fluid gallon, specific gravity of about 1.375, pH 5, and a calcium to phosphorus ratio of about 1 to 1. The product is most suitable for dogs and other small breed animals.

It will be noted that, in this and the preceding Example I, the proportion of the biphosphate or acid phosphate is in excess of the amount required theoretically to convert to the form of phosphates all of the heavy metals added originally in other form. Thus in Example II, the calcium, magnesium and manganese are added originally in the form of phosphates; the proportion of the potassium acid phosphate used is in large excess of the amount required to convert the copper, iron and zinc used to the form of a phosphate.

EXAMPLE III

This mixture is identical with and is made in the same manner as the mixture of Example II, with the addition of 18.3 grams of ascorbic acid dissolved in 30 cc. of water, and sufficient phosphoric or citric acid to reduce the pH of the mixture to approximately 3.0 to 3.4. The ascorbic acid and other acids are best added after mix A and mix B are combined. In this way, the ascorbic acid is subjected to a minimum of oxidation.

The product obtained in this example may be used as a dietary supplement for man.

EXAMPLE IV

The kind and proportion of mineral materials used were exactly the same as under Example I above, except that the sodium chloride was omitted entirely and replaced by 0.08 gram of potassium iodide.

These mineral materials were incorporated into 1490 grams of invert sugar (containing approximately 67.7% of solids) in the laboratory mixer. The following materials were then added: 26.8 grams of irradiated dry yeast, 0.135 gram of thiamine hydrochloride, 17.32 grams of a natural concentrate of riboflavin (containing 5 milligrams of riboflavin per gram), and 0.976 gram of nicotinic acid.

To this resulting mixture, designated as mix A, there was added the following mixture of substances designated as mix B: 488 grams of a concentrate derived from an aqueous extraction of rice polishings (containing approximately 50 international units of $B_1$ and 18 micrograms of riboflavin per gram), 1.53 grams of a vitamin A concentrate containing 1,530,000 international units of vitamin A, 107.3 grams of wheat germ oil, and 2340 grams of blackstrap molasses.

The mixes A and B were then thoroughly mixed with each other as described in the previous examples.

A finished supplement for dogs that is especially satisfactory and stable contains the following or somewhat greater proportions by weight of vitamins and minerals for each avoirdupois ounce: 6665 U. S. P. units of vitamin A, 225 units of vitamin $B_1$, 533 micrograms of vitamin $B_2(G)$, 125 micrograms of vitamin $B_6$, 957 U. S. P. units of vitamin D, 5.33 milligrams of nicotinic acid, 10.65 minims of wheat germ oil, and the factors of the vitamin B complex derived from the combination of yeasts, and substantially not less than 875 mgms. of calcium, 790 mgms. of sodium, 13.6 mgms. of iron, 1.3 mgms. of manganese, 45.4 mgms. of magnesium, 2.1 mgms. of copper, 2.1 mgms. of zinc, and 0.0375 mgm. of iodine.

A vitamin and mineral composition that is particularly effective for horses contains not less than the following amounts (by units or weights) of the several ingredients for each avoirdupois ounce:

(1) Vitamins

A _____ 6,665 units (U. S. P.)
$B_1$ _____ 354 units (U. S. P.)
$B_2$(G) _____ 533 micrograms
$B_6$ _____ 177 micrograms
D _____ 957 units (U. S. P., and
E _____ as 10.65 minims wheat germ oil)
Nicotinic acid _____ 5.33 mgms.

Other factors of vitamin B complex as derived from described sources.

(2) Minerals

|  | Mgms. |
|---|---|
| Calcium | 1,188 |
| Phosphorus | 790 |
| Potassium | 220 |
| Sodium | 322.5 |
| Iron | 24 |
| Magnesium | 45.4 |
| Manganese | 4.4 |
| Copper | 3.2 |
| Zinc | 3.2 |
| Iodine | 0.38 |

Products made as described are substantially stable in their vitamin activity as contrasted with the rapid decrease of vitamin activity that is experienced when the vitamins are left in contact with aqueous solutions of substantial concentrations of ions of calcium, iron and other heavy metal.

In making a vitamin composition it is customary to include vitamins A and $B_1$ in amounts 10% higher than claimed, in order to allow for inaccuracies in the biological assay of these vitamins. When compositions made as described are tested after several months standing, the decrease in vitamin A and $B_1$ activity averages not substantially more than the excess vitamin content introduced above that claimed and the loss is small or negligible for other vitamins contained therein.

The composition of Example IV, for instance, was fed in a test beginning 5 months and ending about 7 months after the product was made. The extent of the change during the 5 to 7 months, within the limits of experimental error, is shown in the following table:

| Vitamin | Method of assay | Content per ounce | |
|---|---|---|---|
| | | Originally | Found after 5 to 7 months |
| A | U. S. P. IX method | Units 6,665+10%[1] | 6,654 |
| $B_1$ | U. S. P. curative | Units 266+10%[1] | 260 |
| $B_2$ | Sherman Bourquin | Microg. 400 | 409 |
| $B_6$ | Supplee, Bender & Kohlenberg | Microg. 133 | 133 |
| D | U. S. P. IX method | Units 718 | 727 |

[1] Allowance for experimental error.

It will be understood that the details given are for the purpose of illustration and that variations within the spirit of the invention are intended to be included within the scope of the appended claims.

What I claim is:

1. A substantially stable vitamin and mineral composition comprising water soluble vitamins including $B_1$ and water insoluble vitamins, heavy metal compounds as dietary supplements that are soluble in gastric juice but insoluble in water at a pH between 3 and 6, an alkali metal acid phosphate in amount in excess of the proportion required theoretically to convert to phosphates all heavy metal compounds originally present in the form of compounds other than phosphates, and an aqueous solution of pH between 3 and 6 serving as the base medium, the water soluble vitamins and alkali metal acid phosphate being dissolved in the said medium and the water insoluble vitamins being emulsified and the heavy metal compounds being suspended in the medium substantially completely in undissolved condition and in a phase separate from the water soluble vitamins.

2. A composition as described in claim 1, the aqueous medium being a viscous solution of a sugar, the sugar serving to repress the ionization of the dissolved mineral salts and the viscous solution minimizing segregation of the suspended material.

LOUIS FREEDMAN.